United States Patent [19]

Pinot de Moira

[11] Patent Number: 4,612,556

[45] Date of Patent: Sep. 16, 1986

[54] SELF-CONTAINED PRESSURE SENSITIVE COPYING MATERIAL AND ITS PRODUCTION

[75] Inventor: Peter Pinot de Moira, High Wycombe, England

[73] Assignee: The Wiggins Teape Group Limited, Hampshire, England

[21] Appl. No.: 658,365

[22] Filed: Oct. 5, 1984

[30] Foreign Application Priority Data

Oct. 7, 1983 [GB] United Kingdom ............... 8326902

[51] Int. Cl.[4] .................... B41L 1/20; B41M 3/12
[52] U.S. Cl. ................................ 346/215; 264/4.3; 346/209; 346/214; 422/5; 427/150; 427/151; 428/321.5; 428/914
[58] Field of Search ............... 427/150, 151; 346/214, 346/215; 428/321.5

[56] References Cited

U.S. PATENT DOCUMENTS

| | | | |
|---|---|---|---|
| 3,447,945 | 6/1969 | Mishima et al. | 427/150 |
| 4,028,320 | 6/1977 | Sera et al. | 260/117 |
| 4,066,636 | 1/1978 | Sera et al. | 260/117 |
| 4,105,823 | 8/1978 | Hasler et al. | 428/914 X |
| 4,223,060 | 9/1980 | Raine et al. | 428/914 X |
| 4,308,320 | 12/1981 | Schiller | 428/511 |
| 4,409,156 | 10/1983 | Hoshi et al. | 264/4.33 |
| 4,450,123 | 5/1984 | Egawa et al. | 264/4.7 |
| 4,460,722 | 7/1984 | Igarashi et al. | 264/4.3 X |

FOREIGN PATENT DOCUMENTS

| | | |
|---|---|---|
| 57-5054k | 3/1982 | Japan . |
| 60-29293 | 7/1985 | Japan . |
| 811443 | 4/1959 | United Kingdom . |
| 931532 | 7/1963 | United Kingdom . |
| 1146117 | 3/1969 | United Kingdom . |
| 1216528 | 12/1970 | United Kingdom . |
| 1315471 | 5/1973 | United Kingdom . |
| 1348728 | 3/1974 | United Kingdom . |
| 1369569 | 10/1974 | United Kingdom . |
| 1466698 | 3/1977 | United Kingdom . |
| 1478788 | 7/1977 | United Kingdom . |
| 1483542 | 8/1977 | United Kingdom . |
| 1483303 | 8/1977 | United Kingdom . |
| 1507739 | 4/1978 | United Kingdom . |
| 1517442 | 7/1978 | United Kingdom . |
| 1524742 | 9/1978 | United Kingdom . |
| 1539866 | 2/1979 | United Kingdom . |
| 2003529 | 3/1979 | United Kingdom . |
| 2062570 | 5/1981 | United Kingdom . |
| 2094257 | 9/1982 | United Kingdom . |

*Primary Examiner*—Richard D. Lovering
*Attorney, Agent, or Firm*—Burns, Doane, Swecker & Mathis

[57] ABSTRACT

Free formaldehyde is removed from a formaldehyde-containing suspension of microcapsules by the addition of a compound having a B dicarbonyl group or a cyclic ketone. The thus-treated microcapsules are particularly suitable for the production of self-contained pressure sensitive copying material in which the image-generating reactants are present in a single coating composition.

5 Claims, No Drawings

SELF-CONTAINED PRESSURE SENSITIVE COPYING MATERIAL AND ITS PRODUCTION

The present invention relates to a method for the removal of free formaldehyde from a formaldehyde-containing suspension of microcapsules, particularly but not exclusively for use in self-contained pressure sensitive copying materials.

Self-contained pressure sensitive copying material comprises a sheet material which carries both pressure-rupturable microcapsules containing a colourless colour former material and a colour developer material reactive with the colourless colour former. When the microcapusules are ruptured as a result of pressure from, for example, a typewriter key, the colourless colour former is released to react with the colour developer and produce an image.

Self-contained pressure sensitive copying materials of this general type are described in UK Patent No. 1524742 which is particularly concerned with the application of the microcapsules and colour developer (in this case a clay) in a single coating composition.

The microcapsules used in copying material of this type may have walls containing urea and/or melamine formaldehyde precondensates such as those disclosed in UK Patent No. 1507739.

One of the problems with this type of microcapsule is that free formaldehyde is evolved during the capsule manufacture. The same problem can arise even with capsules produced by coacervation if formaldehyde solution is used as a hardening agent and/or a preservative. This free formaldehyde is undesireable from the users' point of view due to the unpleasant odor and irritant effects of the formaldehyde, particularly when the microcapsule suspension is incorporated into a coating mix prior to coating onto a sheet material.

Several methods have been suggested in the art to overcome these undesirable efects. UK Patent No. 1146117 discloses the addition of sodium sulphite or urea to a microcapsule dispersion to remove free formaldehyde, whilst Japanese patent Application No. 57050541 discloses the addition of dihydroxyacetone to a microcapsule dispersion to remove the free formaldehyde. UK Patent No. 1507739 discloses the use of an ammonium compound for quenching free formaldehyde. The last mentioned expedient, which has been commercially practised, has the drawback that the reaction product of the excess formaldehyde and the quenching agent may adversely affect the imaging ability of the copying paper. In transfer carbonless copying paper in which the microcapsules and colour developer are not together on one surface of the paper, this problem is not serious, but in self-contained paper the problem is more noticeable.

It is an object of the present invention to provide a method for removing the free formaldehyde, or at least to reduce the amount present, without unacceptably impairing the image-forming ability of the copying material.

According to the present invention there is provided a method for the removal of free formaldehyde from a formaldehyde-containing suspension of microcapsules by the addition of a quenching agent, characterised in that the quenching agent is a compound having a $\beta$ dicarbonyl group or is a cyclic ketone.

According to a further aspect of the present invention, there is provided a method for producing a self-contained pressure sensitive copying material comprising the steps of coating a sheet material with a coating composition comprising a colour developer material and a suspension of microcapsules containing a colour former solution, characterised in that a compound having a $\beta$ dicarbonyl group or a cyclic ketone is added to the suspension of microcapsules.

Preferably the compound having a $\beta$ dicarbonyl group is one selected from malonic acid, acetylacetone, ethylacetone acetate, malonamide, diethyl malonate or another malonic ester. Preferred cyclic ketones include cylcohexanone or cyclopentanone.

Preferably the compound having a $\beta$ dicarbonyl group is added to the microcapsule suspension in an amount of 1 to 2% by weight of the suspension. The present invention is particularly useful when the microcapsules used are those described in Example 4 of UK Patent No. 1524742. Thus in a preferred embodiment of the present invention free formaldeyde is removed by adding acetylacetone to a suspension of microcapsules having walls comprising a urea-formaldehyde precondensate, a melamine-formaldehyde precondensate and a water soluble polymer. The thus treated microcapsule suspension is mixed with an appropriate amount of particulate colour developer and the resulting composition coated onto a sheet material in a single pass to produce a self-contained pressure sensitive copying sheet.

Preferably the colour developer is an acidic clay such as one of the acid-washed montmorillonite clays sold under the trademark Silton by Mizusawa Industrial Chemicals Ltd. of Japan.

The quenching agent may alternatively be added to the microcapsule suspension after the colour developer has been added.

The present invention will now be illustrated by reference to the following examples:

EXAMPLE 1

2.0 g acetylacetone were added to 100 g capsule suspension prepared according to UK Patent No. 1507739. This mixture was then shaken in a flask for one minute to remove the free formaldehyde present in the capsule suspension. After this period of time, there was no apparent odor of formaldehyde and the atmosphere in the flask above the mixture was then tested with a "Lion" formaldemeter to determine the actual concentration of formaldehyde remaining.

The above procedure was then repeated using malonic acid and malonamide in place of acetylacetone. The following results were obtained.

| Additive | Quantity added to capsule suspension (100 g) | Level of Formaldehyde ("Lion" Formaldemeter Reading) |
| --- | --- | --- |
| Acetylacetone | 2.00 g | 8 ppm |
| Malonic acid | 2.00 g | 53 ppm |
| Malonamide | 2.00 g | 67 ppm |

EXAMPLE 2

1.3 g acetylacetone were added to a 100 g capsule suspension prepared according to UK Patent No. 1507739. This mixture was shaken as described in Example 1 and tested for the pressure of formaldehyde. There was no odour of formaldehyde.

The capsule suspension was then combined with a suspension of clay colour developer, (that sold under the trademark "Silton" by Mizusawa Industrial Chemicals), to produce a coating mix containing by weight on a dry basis 38% capsules, 32% clay, 19% wheatstarch and 10% latex. This coating mix was then coated onto a paper sheet using a laboratory Meyer bar coater.

The resultant coated sheet was then dried to produce a self-contained copying paper. No odor of formaldehyde was apparent during the drying.

The coated sheet was then submitted to a standard calender intensity (CI) test to illustrate that the use of acetylacetone to remove the free formaldheyde does not unacceptably interfere with the image-producing properties of the self-contained copying paper.

The calender intensity (CI) test in this case involves passing strips of the paper under test through a laboratory calender to rupture the capsules and thereby produce a colour on the test strip, measuring the reflectance of the thus coloured strip (I) after allowing 2 minutes for the colour to develop and expressing the result ($I/I_o$) as a percentage of an unused control strip ($I_o$). Thus the lower the calender intensity value ($I/I_o$) the more intense the developer colour. The CI value obtained was 66.1 showing that the image-producing properties of the self-contained copying sheet are acceptable.

EXAMPLE 3

A capsule emulsion was prepared as described in UK Patent No 1507739.

3.51 g. acetylacetone quenching agent were then added to 281.87 g of the above mentioned capsule emulsion such that the quenching agent was present in an amount of 1.2% by weight of the emulsion. After stirring gently in a stoppered flask for a few minutes the free formaldehyde level was measured with a Drager tube.

The above procedure was then repeated using cyclopentanone, cyclohexanone and ethylacetoacetate in place of the acetylacetone as the quenching agents.

Additionally, by way of control, the formaldehyde level was measured in the absence of a quenching agent.

A comparative example in which ammonium sulphate (a commercially used quenching agent) was substituted for acetylacetone, was also carried out. The results are shown in Table 3.

TABLE 3

| Additive | Level of Formaldehyde ppm |
| --- | --- |
| none | greater than 50 |
| (NH$_4$)$_2$SO$_4$ | approximately 10 |
| acetylacetone | approximately 11 |
| cyclopentanone | approximately 30 |
| cyclohexanone | approximately 30 |
| ethylacetoacetate | approximately 30 |

Whilst the ammonium sulphate appears to be the most effective at quenching the free formaldeyde, after standing it was noticed that the amount of free formaldehyde increased whilst this did not occur with the other quenching agents.

EXAMPLE 4

The treated capsule emulsions from Example 3 were then combined with a suspension of clay colour developer, ("Silton") to produce a coating mix containing by weight on a dry basis 33% capsules, 34% clay, 21% wheatstarch and 11% latex. The coating mix was then coated onto a paper sheet using a laboratory Meyer bar coater at a coatweight of between 8.5 and 9.5 gm$^{-2}$.

The resultant coated sheet was then dried to produce a self-contained copying paper and the coated sheet subjected to a standard calender intensity test as described in Example 2. The reflectance was measured after allowing 2 minutes for the colour to develop, and also after the colour had been allowed to develop in the dark for about 48 hours.

The results are shown in Table 4.

TABLE 4

| Additive | Background Intensity $I_o$ | CI 2 mins | Dark Developed |
| --- | --- | --- | --- |
| control | 83.0 | 69.6 | 63.7 |
| (NH$_4$)$_2$SO$_4$ | 80.8 | 80.1 | 70.8 |
| acetylacetone | 83.0 | 76.6 | 67.3 |
| cyclopentanone | 83.3 | 73.8 | 66.3 |
| cyclohexanone | 83.3 | 74.3 | 66.6 |
| ethylacetoacetate | 83.3 | 76.1 | 68.7 |

From the above results it can be seen that the control in which no quenching agent has been added produces the best CI values. This is because no quenching agent is present to desensitise the colour developer. However the level of formaldehyde is unacceptable.

Whilst the sample treated with ammonium sulphate had a low level of formaldehyde the CI values indicate that the colour developer has been desensitised to an unacceptable degree.

I claim:

1. A method for producing a self-contained pressure sensitive copying material comprising the steps of coating a sheet material with a coating composition comprising a colour developer material, a formaldehyde-containing suspension of microcapsules containing a colour former solution and a compound having a β-dicarbonyl group selected from the group consisting of malonic acid, acetylacetone, malonamide and diethyl malonate or a cyclic ketone which is added to the suspension of microcapsules in an amount effective to remove free formaldehyde from the suspension.

2. The method as claimed in claim 1 wherein said compound having the β-dicarbonyl group is acetylacetone.

3. The method as claimed in claim 1 wherein said cyclic ketone is cyclohexanone or cyclopentanone.

4. The method as claimed in claim 1 wherein said compound having a β-dicarbonyl group or said cyclic ketone is added to the microcapsule suspension in an amount of 1 to 2% by weight of the suspension.

5. A self-contained pressure sensitive copying material produced by a method as claimed in claim 1.

* * * * *